United States Patent
Diamond (10) Patent No.: US 8,373,330 B2
(45) Date of Patent: Feb. 12, 2013

(54) PIEZOELECTRIC ACTUATOR EMPLOYING SWITCH

(75) Inventor: Michael N. Diamond, Thousand Oaks, CA (US)

(73) Assignee: Transonic Combustion, Inc., Camarillo, CA (US)

( * ) Notice: Subject to any disclaimer, the term of this patent is extended or adjusted under 35 U.S.C. 154(b) by 31 days.

(21) Appl. No.: 12/686,298

(22) Filed: Jan. 12, 2010

(65) Prior Publication Data

US 2010/0176686 A1 Jul. 15, 2010

Related U.S. Application Data

(60) Provisional application No. 61/144,254, filed on Jan. 13, 2009.

(51) Int. Cl.
*H01L 41/09* (2006.01)

(52) U.S. Cl. .............. 310/316.01; 310/316.03; 310/317

(58) Field of Classification Search ............. 310/316.01, 310/316.03, 317
See application file for complete search history.

(56) References Cited

U.S. PATENT DOCUMENTS

| | | | | |
|---|---|---|---|---|
| 4,879,528 A * | 11/1989 | Gotanda | ............................ | 331/4 |
| 5,130,598 A * | 7/1992 | Verheyen et al. | ......... | 310/316.03 |
| 5,910,698 A * | 6/1999 | Yagi | .......................... | 310/316.03 |
| 6,975,123 B1 * | 12/2005 | Malang et al. | ................. | 324/658 |
| 7,141,910 B2 * | 11/2006 | Micko | ....................... | 310/316.01 |
| 7,444,230 B2 | 10/2008 | Cheiky | | |
| 7,546,826 B2 | 6/2009 | Chieky | | |
| 7,657,363 B2 | 2/2010 | Cheiky | | |
| 7,743,754 B2 | 6/2010 | Cheiky | | |
| 2009/0255508 A1 | 10/2009 | Cheiky | | |
| 2010/0017099 A1 | 1/2010 | Becker et al. | | |
| 2010/0024776 A1 | 2/2010 | Frick et al. | | |
| 2010/0126471 A1 | 5/2010 | Cheiky et al. | | |
| 2010/0180866 A1 | 7/2010 | Becker | | |
| 2010/0194238 A1 | 8/2010 | Frick | | |
| 2010/0201290 A1 | 8/2010 | Becker | | |
| 2010/0201291 A1 | 8/2010 | Cheiky | | |
| 2010/0204901 A1 | 8/2010 | Cheiky | | |

OTHER PUBLICATIONS

U.S. Appl. No. 12/778,001, David E. McCann.
U.S. Appl. No. 12/817,136, Michael J. Frick.
U.S. Appl. No. 12/779,786, Michael C. Cheiky.
U.S. Appl. No. 12/755,591, David E. McCann.
U.S. Appl. No. 12/721,499, Jeffrey Bluen.
U.S. Appl. No. 12/534,738, Erick Plambeck.

* cited by examiner

*Primary Examiner* — Thomas Dougherty
(74) *Attorney, Agent, or Firm* — Sheppard, Mullin, Richter & Hampton LLP (57) ABSTRACT

One embodiment of the present invention features a circuit for driving a piezoelectric actuator, comprising a first transmission line to provide an input signal having a time-varying voltage; a second transmission line to provide a predetermined voltage current; a piezoelectric element; and a switch coupled to the second transmission line and the piezoelectric element, the switch configured to electrically connect and disconnect the predetermined voltage current to and from the piezoelectric element based on the input signal.

16 Claims, 6 Drawing Sheets

PIEZOELECTRIC ACTUATOR EMPLOYING SWITCH

CROSS-REFERENCE TO RELATED APPLICATIONS

This application claims priority from U.S. Provisional Patent Application Ser. Nos. 61/144,254 filed Jan. 13, 2009, which is hereby incorporated herein by reference in its entirety.

TECHNICAL FIELD

The present invention relates to piezoelectric devices, and more particularly, some embodiments relate to piezoelectric actuators.

DESCRIPTION OF THE RELATED ART

Piezoelectric actuators comprise a piezoelectric element such as a piezoelectric material (e.g., a crystal, ceramic, or polymer) coupled to electrical contacts to allow a voltage to be applied to the piezoelectric material. Piezoelectric actuators utilize the converse piezoelectric effect to create a mechanical displacement in response to an applied voltage. Such actuators may be used in applications such as machine tools, disk drives, military applications, ink delivery systems for printers, medical devices, precision manufacturing, fuel injection, or any application which requires high precision or high speed fluid delivery.

In most actuators, a single piezoelectric element is used to mechanically actuate the device. While a single-element piezoelectric actuator can precisely control the total actuator displacement, the actual displacement path followed to reach the total displacement is difficult to control. When a driving voltage is applied to a single piezoelectric element, the displacement response is often not linear with respect to the applied voltage. For example, the physical effects of static or dynamic friction, or the nature of the piezoelectric material itself may prevent the actuator from responding linearly according to an applied voltage.

In some applications, a signal voltage is provided to the actuator to cause the actuator to actuate according to a particular displacement function. In these applications, the signal voltage is usually amplified, for example, using an analog amplifier, so that the signal can directly drive the piezoelectric actuator.

BRIEF SUMMARY OF EMBODIMENTS OF THE INVENTION

According to various embodiments of the invention, a circuit is provided that allows the voltage across a piezoelectric element of a piezoelectric actuator to track an input signal without the use of an amplifier.

One embodiment of the invention features a circuit for driving a piezoelectric actuator, comprising a first transmission line to provide an input signal having a time-varying voltage; a second transmission line to provide a predetermined voltage current; a piezoelectric element; and a switch coupled to the second transmission line and the piezoelectric element, the switch configured to electrically connect and disconnect the predetermined voltage current to and from the piezoelectric element based on the input signal.

According to some embodiments of the invention, the circuit further comprises a comparator coupled to the switch, the first transmission line, and the piezoelectric element; wherein the comparator is configured to cause the switch to connect the predetermined voltage current to the piezoelectric element when the input signal has a greater voltage than a voltage across the piezoelectric element, and to disconnect the predetermined voltage current from the piezoelectric element when the input signal has a lesser voltage than a voltage across the piezoelectric element.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Before describing the invention in detail, it is useful to describe an example environment with which the invention can be implemented. One such environment comprises a system requiring high speed or high precision fluid delivery.

Another such environment is a piezoelectric actuator driver of the type described in U.S. patent application Ser. No. 12/686,247, or U.S. patent application Ser. No. 12/652,679, each of which is herein incorporated by reference in its entirety. Further environments may employ piezoelectric actuator drives of these types and a fault recovery system of the type described in U.S. patent application Ser. No. 12/652,681, which is hereby incorporated by reference in its entirety. Another environment is system for defining a piezoelectric actuator waveform of the type described in U.S. Provisional patent application Ser. No. 12/652,674, which is hereby incorporated by reference in its entirety.

Another environment is a fuel injector for fuel delivery to a combustion chamber of an engine. For example, the fuel injector may be a fuel injector for dispensing fuel into a combustion chamber of an internal combustion engine, wherein injector pressure is high enough that the fuel charge operates as a super-critical fluid. An example of this type of fuel injector is disclosed in U.S. Pat. No. 7,444,230, herein incorporated by reference in its entirety.

Another example is a piezoelectrically actuated fuel injector, for example, of the type disclosed in U.S. Provisional Patent Application No. 61/081,326, having a piezo actuated injector pin having a heated portion and a catalytic portion; and a temperature compensating unit; wherein fuel is dispensed into a combustion chamber of an internal combustion engine.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

Figure 1:
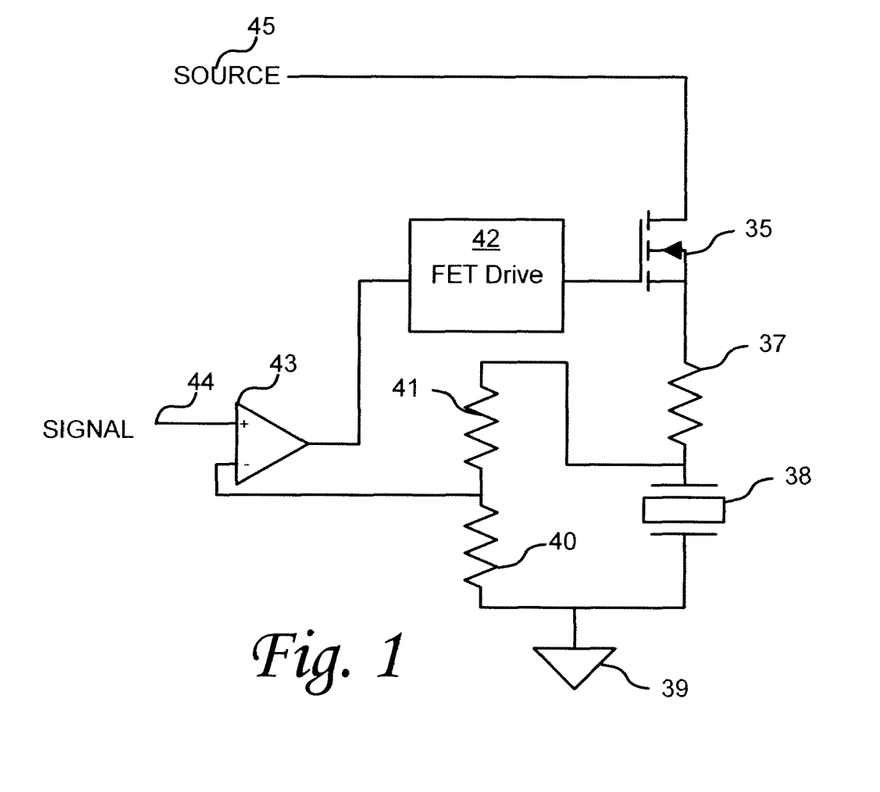
FIG. 1 illustrates a piezoelectric element charging portion of a piezoelectric actuator drive circuit, according to an embodiment of the invention.

FIG. 1 illustrates a piezoelectric element charging portion of a piezoelectric actuator drive circuit, according to an embodiment of the invention. A switch 35 is configured to switchably connect and disconnect a voltage source 45 to a piezoelectric element 38. For example, the switch may be a field effect transistor (FET) 35 configured to act as a switch controlled by the FET driver 42. As illustrated, a comparator 43 is configured to compare the voltage across the piezoelectric element 38 with a signal voltage 44. For example, the comparator 43 may be an operational amplifier configured as a voltage comparator, or a dedicated voltage comparator. In some embodiments, scaling resistors 41 and 40 are provided. The resistances of the scaling resistors may be chosen to scale the voltage across the piezoelectric element to an appropriate level for comparison with the signal.

The comparator 43 is configured such that when the voltage of the signal 44 is greater than the voltage across the piezoelectric element 38, the comparator 43 connects the voltage source 45 to the piezoelectric element 38 using the switch 35 and FET driver 42. The piezoelectric element has a capacitance, and acts as a capacitor in the circuit. When the voltage source 45 is connected to the piezoelectric element 38, the voltage across the element rises, causing the element to actuate. When the voltage across the element rises above the voltage of the signal, the comparator switches the switch 35 to disconnect the voltage source 45. When the voltage source 45 is disconnected, the voltage across the element remains constant, until the signal is again higher than the voltage across the element, again causing the element to actuate. Accordingly, the illustrated circuit causes the voltage across the piezoelectric element to track the rising portion of a signal voltage, thereby causing the piezoelectric element to actuate in response to the signal.

In further embodiments, a current limiter, such as current limiting resistor 37 may be provided to limit the amount of current flowing through the circuit. The rate of voltage increase across the piezoelectric element 38 will depend on the voltage of the voltage source 45, the voltage across the element, and the resistance of the current limiting resistor 37. In particular embodiments, the source voltage 45 and the resistance of the current limiting resistor 37 are chosen such that the rate of voltage increase across the piezoelectric voltage exceeds the rate of voltage change of the signal 44. In these embodiments, the voltage change across the piezoelectric element does not lag behind the voltage change of the signal.

Figure 2:
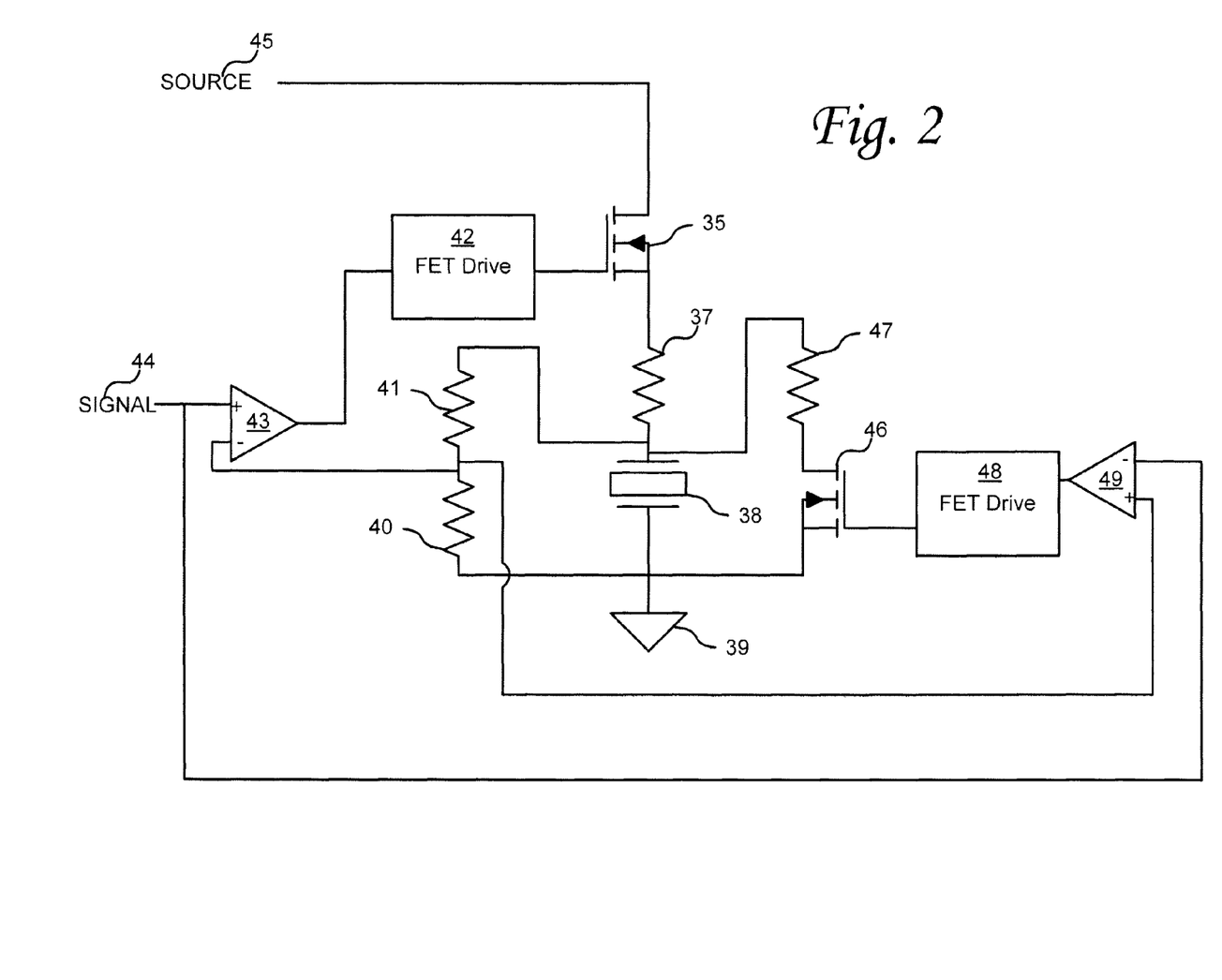
FIG. 2 illustrates a circuit configured to charge and discharge a piezoelectric element, according to an embodiment of the invention.

FIG. 2 illustrates a circuit configured to charge and discharge a piezoelectric element, according to an embodiment of the invention. The charging portion of the circuit is configured as in FIG. 1. The circuit further comprises a discharging portion. A second switch, for example, FET 46 and FET driver 48, is configured to switchably connect and disconnect the piezoelectric element 38 to the ground 39. A second comparator 49 is configured to compare the signal voltage 44 with the voltage across the piezoelectric element 38. The second comparator 49 uses the switch to connect the element 38 to the ground when the voltage across the piezoelectric element 38 is greater than the signal voltage 44. The second comparator 49 disconnects the piezoelectric element 38 from the ground when the voltage across the piezoelectric element 38 is less than the signal voltage 44. Accordingly, the voltage across the piezoelectric element tracks the signal voltage as the signal voltage drops, and the piezoelectric element contracts in response. The rate of voltage drop across the piezoelectric element 38 is a function of the element's capacitance and the resistance between the element and ground. Accordingly, a resistor 47 may be included in the circuit to control the rate of voltage discharge across the piezoelectric element. In further embodiments, the circuit can be configured so that both switches are prevented from activating simultaneously. For example, a time delay and logic circuitry can be added that prevents one switch from activating for the time the other switch is active plus the time delay.

Figure 3:
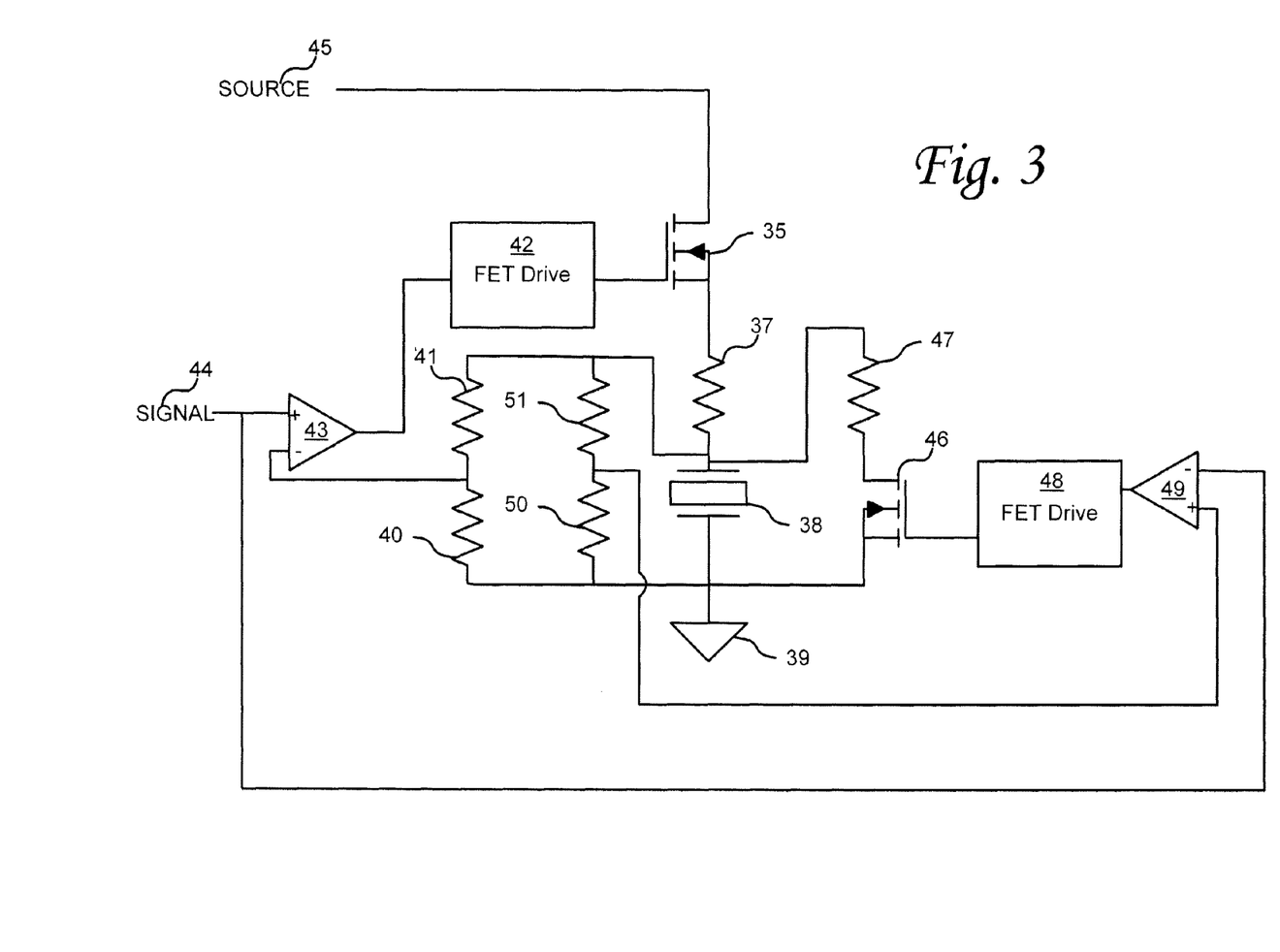
FIG. 3 illustrates a circuit employing a second set of scaling resistors and configured to charge and discharge a piezoelectric element, according to an embodiment of the invention.

FIG. 3 illustrates a circuit employing a second set of scaling resistors and configured to charge and discharge a piezoelectric element, according to an embodiment of the invention. The circuit in FIG. 3 is configured to operate as in FIG. 2 with the addition of scaling resistors 51 and 50. Scaling resistors 51 and 50 scale the voltage across the piezoelectric element to an appropriate level for comparison with the signal. In some embodiments, the resistance of scaling resistors 51 and 50 may be chosen to be different than that of scaling resistors 41 and 40. In these embodiments, the voltage across the piezoelectric element 38 is scaled differently for input into comparator 43 and comparator 48.

In a particular embodiment, resistor 41 has a resistivity of about 182 kΩ and resistor 40 has a resistivity of about 7.5 kΩ. This results in the comparator 43 comparing the signal voltage 44 with a voltage equal to 7.5/(182+7.5)=3.96% of the voltage across piezoelectric element 38. In this embodiment, resistor 51 has a resistivity of about 200 kΩ and resistor 50 has a resistivity of about 7.5 kΩ. This results in the comparator 49 comparing the signal voltage 44 with a voltage equal to 7.5/(200+7.5)=3.6% of the voltage across piezoelectric element 38.

As described above, in some embodiments, the voltage presented to the first comparator 43 is scaled differently than the voltage presented to the second comparator 49. This difference in scaling ratios can create a band between the first and second comparators where the first comparator will deactivate the first switch but the second comparator will not activate the second switch, and vice versa, such that neither switch is turned on for a certain interval. In some embodiments, the band helps to prevent oscillations that may be created by current overshoot. Current overshoot can occur due to delays introduced by the circuit. For instance, when comparator 43 turns off switch 35, several sources of delay slow this process down. First, distributed capacitance slightly delays the fed back voltage. Next, the comparator 43 has a switching delay time. The FET driver 42 is optically isolated, and this contributes some delay time. Finally, the FET 35 itself also has some delay. This delay—between when the comparator detects that the switch 35 should turn off and when the switch 35 actually does turn off—results in an overshoot current that continues to charge the piezoelectric element 38. Similar delays on the discharge portion of the circuit result in further overshoot. This overshoot can cause oscillations where the charging circuit portion and the discharging circuit portion alternately activate, reducing the accuracy with which the piezoelectric element tracks the signal voltage. Increasing the size of the scaling band can reduce or eliminate the oscillatory overshoot, at the cost of less control over the voltage across the piezoelectric element 38.

In other embodiments, additional methods of creating a band may be employed. For example, in one embodiment, a single set of feedback scaling resistors may be employed as in FIG. 2 and an offset voltage may be added to the signal 44 for comparator 43 or 49. For example, a small positive voltage added to the signal input of comparator 43 or a small negative voltage added to the signal input of comparator 49 can achieve the effects of the two scaling resistors 51 and 50.

Figure 4:
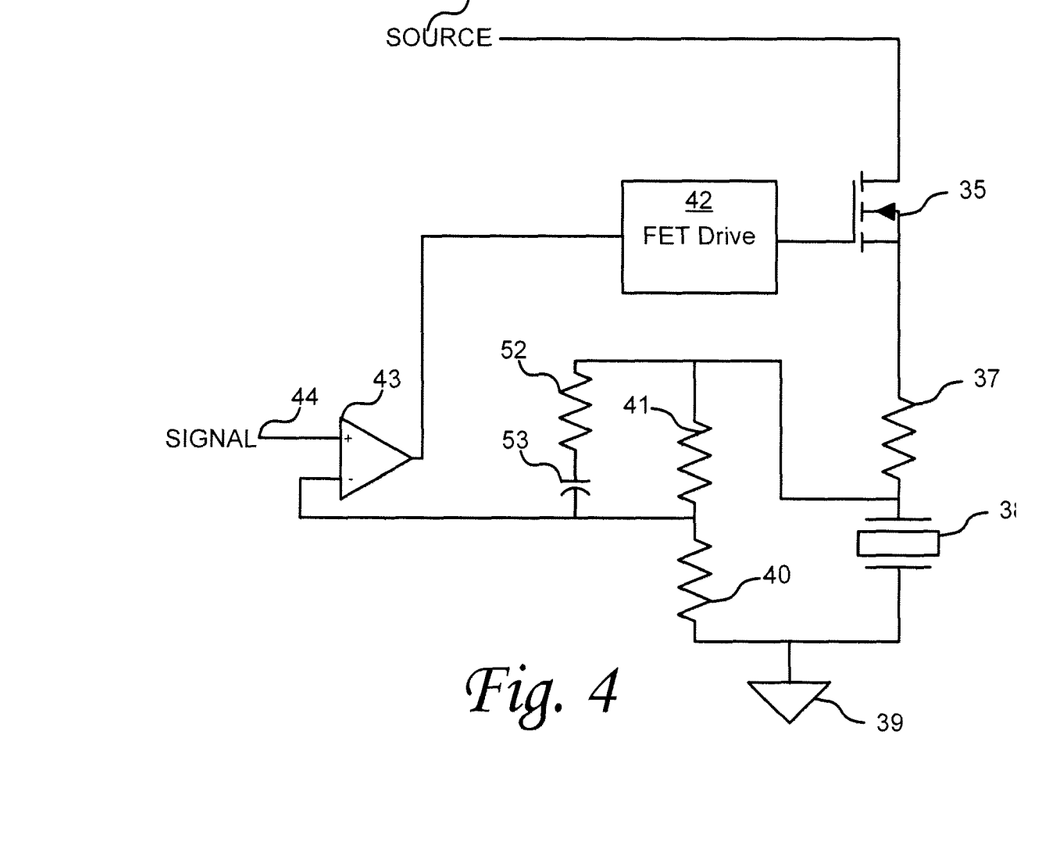
FIG. 4 illustrates derivative feedback elements added to a piezoelectric charging circuit portion of the type described with respect to FIG. 1.

In situations where more precise tracking of the signal waveform is desired, derivative feedback can be added to the circuit. Adding a small voltage term to the comparators that is based on the voltage across the capacitor's rate of change makes the circuit somewhat predictive and can compensate for the delays in the control portions of the circuit. FIG. 4 illustrates derivative feedback elements added to a piezoelectric charging circuit portion of the type described with respect to FIG. 1. The addition of a resistor 52 in series with a capacitor 53, which is in parallel to resistor 41 adds a voltage to comparator 43 that is proportional to the rate of voltage change across piezoelectric element 38 but that does not change the DC level steady-state responsiveness of the circuit. In some implementations, these additions alone may not sufficiently solve the overshoot problem. For instance, in embodiments employing charging circuits and discharging circuits, the addition of elements 52 and 53 alone can result in the comparator 43 disconnecting the switch 35 earlier, which is desired. However, the derivative feedback elements 52 and 53 also make the comparator 43 connect the switch 35 earlier, which is undesired and can actually increase the overshoot problem.

Figure 5:
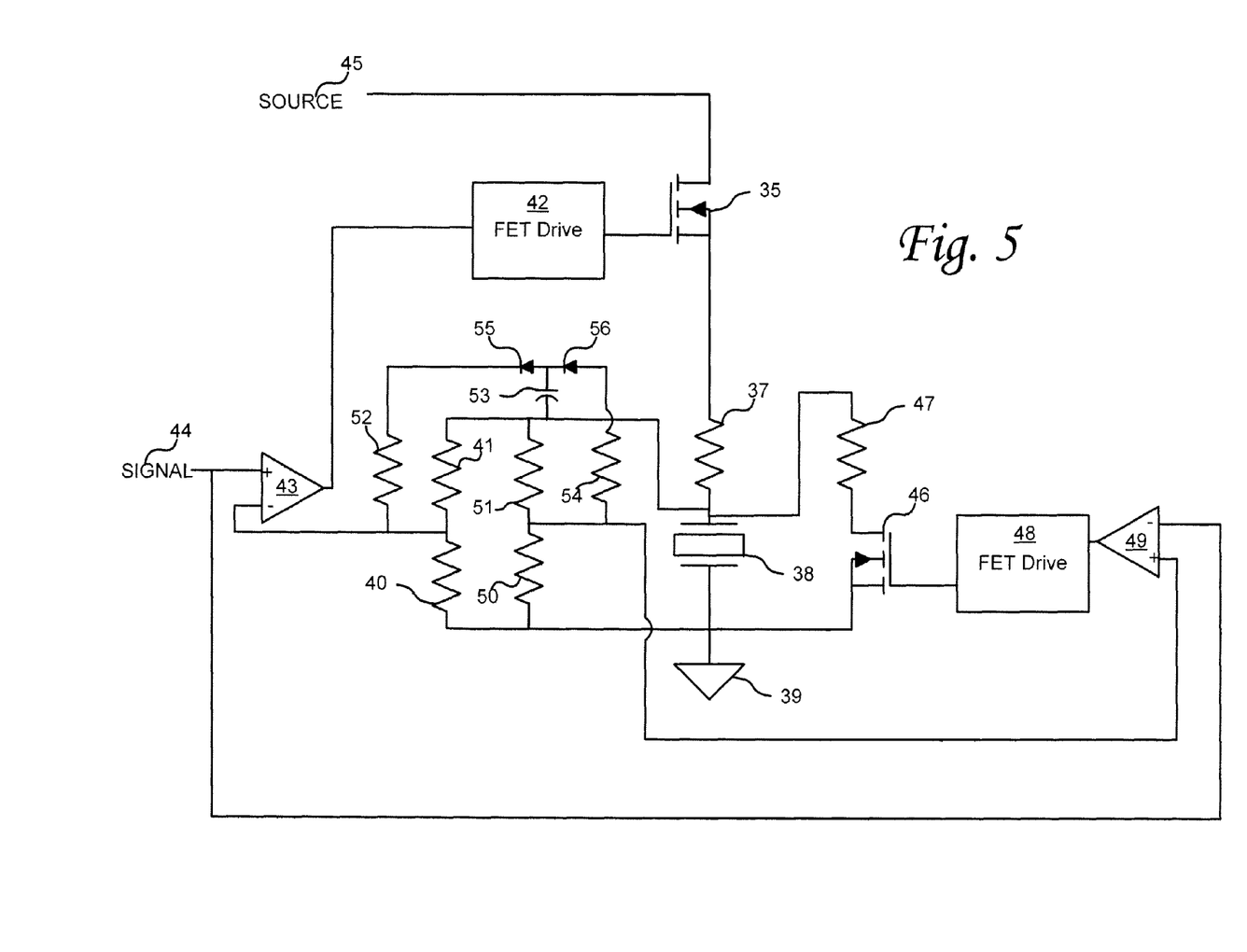
FIG. 5 illustrates a circuit that provides derivative feedback to the charging circuit portion and discharging circuit portion during different phases of operation.

FIG. 5 illustrates a circuit that provides derivative feedback to the charging circuit portion and discharging circuit portion during different phases of operation. In the illustrated circuit, diodes 55 and 56 are put in series with resistors 52 and 54, respectively. The diodes 55 and 56 split the derivative feedback voltage into rising feedback and falling feedback, respectively. In this embodiment, when the voltage across the piezoelectric element is rising (i.e. when the source 45 is connected through switch 35) a rising derivative feedback voltage is provided to comparator 43, causing the switch 35 to disconnect earlier. Similarly, when the voltage across the piezoelectric element is falling (i.e. when switch 46 is connected), a falling derivative feedback voltage is provided to comparator 49 causing the switch 46 to disconnect earlier. In a particular embodiment, a capacitance of 47 pF for capacitor 53 and a resistivity of 150 kΩ for each of resistor 52 and resistor 54 was determined to provide improved derivative feedback across a wide range of different piezoelectric elements.

Figure 6:
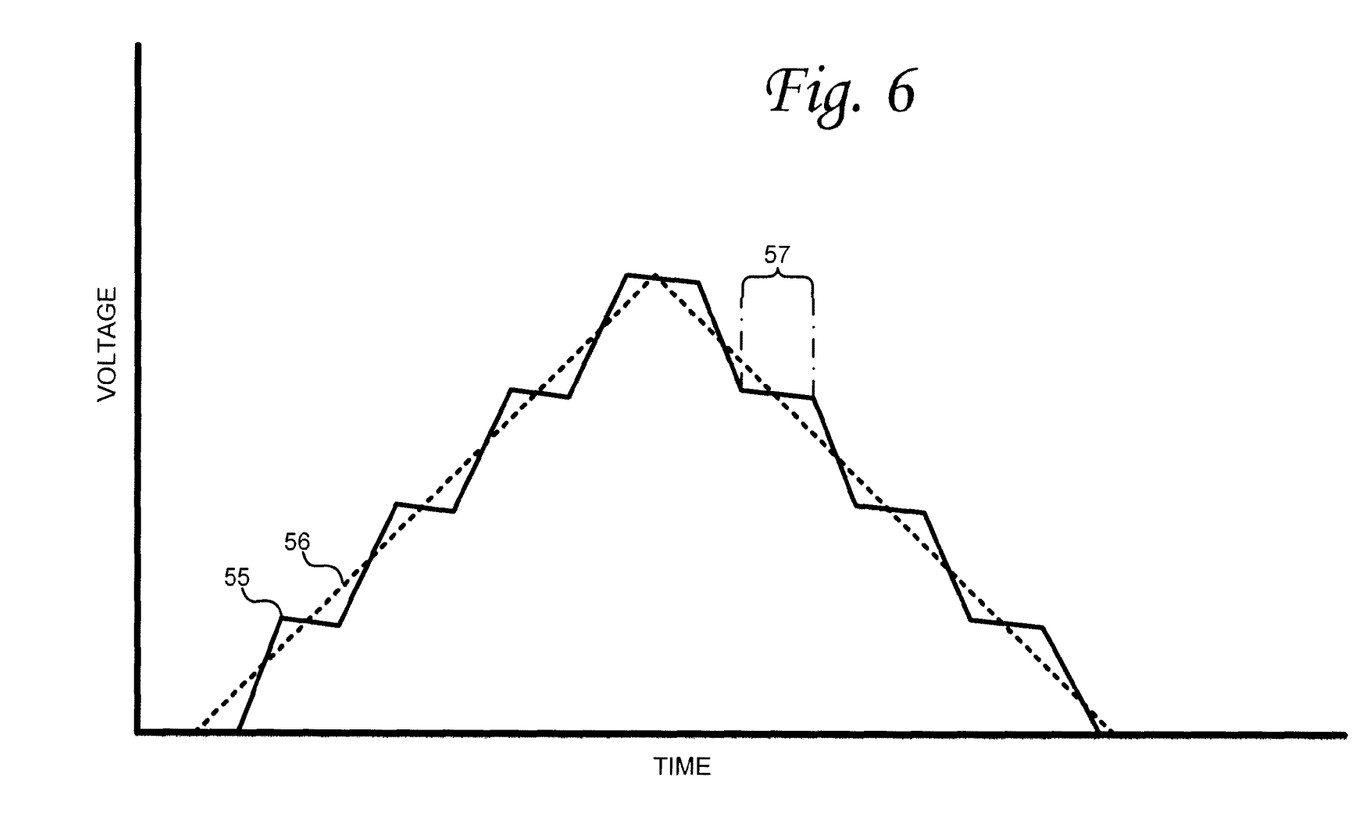
FIG. 6 illustrates the voltage across a piezoelectric element in relation to a signal voltage, according to an embodiment of the invention.

FIG. 6 is illustrative of the voltage across a piezoelectric element in relation to a signal voltage, according to an embodiment of the invention. For purposes of illustration only, example signal 56 is depicted as a triangular wave. Piezoelectric element voltage 55 corresponds to the voltage across a piezoelectric element in a circuit having a time delay, as described herein. As the signal 56 increases in voltage, the element voltage 55 rises until it exceeds the signal voltage, at which point the element is disconnected from the source voltage. The time delay prevents the system from responding during the time delay period 57. During the time delay period, the voltage across the element stays substantially constant. After the time delay period, the signal 56 has a greater voltage than the element, so the source is connected and the element voltage 55 increases. When the signal voltage 56 begins decreasing, the element voltage 55 is greater then the signal voltage. Accordingly, the circuit connects the element to the ground and the element voltage 55 drops until it is below the signal voltage. During the time delay 57, the voltage 55 remains constant. After the time delay, the signal voltage 56 drops below the element voltage 55 and the element is again connected to the ground. Accordingly, the voltage across the piezoelectric element tracks the signal voltage.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A circuit for driving a piezoelectric actuator, comprising:
a first transmission line to provide an input signal having a time-varying voltage;
a second transmission line to provide a current having a predetermined voltage;
a piezoelectric element;
a first switch coupled to said second transmission line and said piezoelectric element, wherein said first switch is configured to electrically connect and disconnect said predetermined voltage current to and from said piezoelectric element based on said input signal;
an electrical ground; and
a second switch coupled to said piezoelectric element and said ground, wherein said second switch is configured to electrically connect and disconnect said piezoelectric element to and from said electrical ground based on said input signal.

2. A circuit for driving a piezoelectric actuator, comprising:
a first transmission line to provide an input signal having a time-varying voltage;
a second transmission line to provide a current having a predetermined voltage;
a piezoelectric element;
a first switch coupled to said second transmission line and to said piezoelectric element, said first switch configured to electrically connect and disconnect said predetermined voltage current to and from said piezoelectric element based on said input signal;
a first comparator coupled to said first switch, said first transmission line, and said piezoelectric element, wherein said first comparator is configured to cause said first switch to:
    connect said current to said piezoelectric element when said input signal has a greater voltage than a voltage across said piezoelectric element scaled by a predetermined scaling factor, and
    disconnect said current from said piezoelectric element when said input signal has a lesser voltage than said voltage across said piezoelectric element scaled by said predetermined scaling factor;
an electrical ground;
a second switch coupled to said piezoelectric element and to said electrical ground;
a second comparator coupled to said second switch, said first transmission line, and said piezoelectric element, wherein said second switch is configured to electrically connect and disconnect said piezoelectric element to said ground, based on said input signal, and wherein said second comparator is configured to cause said second switch to:
    connect said piezoelectric element to said electrical ground when said input signal has a lesser voltage than a voltage across said piezoelectric element scaled by a predetermined scaling factor, and
    disconnect said piezoelectric element from said electrical ground when said input signal has a greater voltage than said voltage across said piezoelectric element scaled by said predetermined scaling factor.

3. A circuit for driving a piezoelectric actuator, comprising:
a first transmission line to provide an input signal having a time-varying voltage;
a second transmission line to provide a current having a predetermined voltage;
a piezoelectric element;
a first switch coupled to said second transmission line and to said piezoelectric element, said first switch configured to electrically connect and disconnect said predetermined voltage current to and from said piezoelectric element based on said input signal;
a first comparator coupled to said first switch, said first transmission line, and said piezoelectric element, wherein said first comparator is configured to cause said first switch to:
    connect said current to said piezoelectric element when said input signal has a greater voltage than a voltage across said piezoelectric element scaled by a predetermined scaling factor;
    disconnect said current from said piezoelectric element when said input signal has a lesser voltage than said voltage across said piezoelectric element scaled by said predetermined scaling factor;
an electrical ground;
a second switch coupled to said piezoelectric element and to said electrical ground;

a second comparator coupled to said second switch, said first transmission line, and said piezoelectric element, wherein said second switch is configured to electrically connect and disconnect said piezoelectric element to said ground, based on said input signal, wherein said second comparator is configured to cause said second switch to:
connect said piezoelectric element to said electrical ground when said input signal has a lesser voltage than a voltage across said piezoelectric element scaled by a predetermined scaling factor; and
disconnect said piezoelectric element from said electrical ground when said input signal has a greater voltage than said voltage across said piezoelectric element scaled by said predetermined scaling factor; and
a current limiting resistor coupled to said piezoelectric element having a predetermined resistance and configured to limit said current provided to said piezoelectric element from said second transmission line, wherein said predetermined voltage and said predetermined resistance are chosen so that, when said piezoelectric element is connected to said second transmission line, a rate of voltage increase across said piezoelectric element exceeds a rate of change of voltage of said input signal.

4. A circuit for driving a piezoelectric actuator, comprising:
a first transmission line to provide an input signal having a time-varying voltage;
a second transmission line to provide a current having a predetermined voltage;
a piezoelectric element;
a first switch coupled to said second transmission line and said piezoelectric element, said switch configured to electrically connect and disconnect said predetermined voltage current to and from said piezoelectric element based on said input signal
a first comparator coupled to said first switch, said first transmission line, and said piezoelectric element, wherein said first comparator is configured to cause said first switch to:
connect said current to said piezoelectric element when said input signal has a greater voltage than a voltage across said piezoelectric element scaled by a predetermined scaling factor, and
disconnect said current from said piezoelectric element when said input signal has a lesser voltage than said voltage across said piezoelectric element scaled by said predetermined scaling factor;
an electrical ground;
a second switch coupled to said piezoelectric element and to said electrical ground, wherein said second switch is configured to electrically connect and disconnect said piezoelectric element to said ground based on said input signal;
a second comparator coupled to said second switch, said first transmission line, and said piezoelectric element, wherein said second comparator is configured to cause said second switch to:
connect said piezoelectric element to said electrical ground when said input signal has a lesser voltage than a voltage across said piezoelectric element scaled by a predetermined scaling factor, and
disconnect said piezoelectric element from said electrical ground when said input signal has a greater voltage than said voltage across said piezoelectric element scaled by said predetermined scaling factor, wherein a first predetermined scaling factor is smaller than a second predetermined scaling factor.

5. A circuit for driving a piezoelectric actuator, comprising:
a first transmission line to provide an input signal having a time-varying voltage;
a second transmission line to provide a current having a predetermined voltage;
a piezoelectric element;
a first switch coupled to said second transmission line and to said piezoelectric element, said first switch configured to electrically connect and disconnect said predetermined voltage current to and from said piezoelectric element, based on said input signal;
a first comparator coupled to said first switch, said first transmission line, and said piezoelectric element, wherein said first comparator is configured to cause said first switch to:
connect said current to said piezoelectric element when said input signal has a greater voltage than a voltage across said piezoelectric element scaled by a predetermined scaling factor, and
disconnect said current from said piezoelectric element when said input signal has a lesser voltage than said voltage across said piezoelectric element scaled by said predetermined scaling factor;
an electrical ground;
a second switch coupled to said piezoelectric element and to said electrical ground, wherein said second switch is configured to electrically connect and disconnect said piezoelectric element to said ground, based on said input signal;
a second comparator coupled to said second switch, said first transmission line, and said piezoelectric element, wherein said second comparator is configured to cause said second switch to:
connect said piezoelectric element to said electrical ground when said input signal has a lesser voltage than a voltage across said piezoelectric element scaled by a predetermined scaling factor, and
disconnect said piezoelectric element from said electrical ground when said input signal has a greater voltage than said voltage across said piezoelectric element scaled by said predetermined scaling factor, wherein a first predetermined scaling factor is smaller than a second predetermined scaling factor; and
a capacitor, a first diode, and a feedback resistor connected in series and coupled to said first comparator, wherein said first diode is configured such that a derivative feedback voltage is provided to said first comparator when said voltage across said piezoelectric element is increasing.

6. A circuit for driving a piezoelectric actuator, comprising:
a first transmission line to provide an input signal having a time-varying voltage;
a second transmission line to provide a current having a predetermined voltage;
a piezoelectric element;
a first switch coupled to said second transmission line and to said piezoelectric element, wherein said first switch is configured to electrically connect and disconnect said predetermined voltage current to and from said piezoelectric element, based on said input signal;
a first comparator coupled to said first switch, said first transmission line, and said piezoelectric element, wherein said first comparator is configured to cause said first switch to:
connect said current to said piezoelectric element when said input signal has a greater voltage than a voltage across said piezoelectric element, scaled by a predetermined scaling factor, and
disconnect said current from said piezoelectric element when said input signal has a lesser voltage than said voltage across said piezoelectric element scaled by said predetermined scaling factor;
an electrical ground;
a second switch coupled to said piezoelectric element and to said electrical ground, wherein said second switch is configured to electrically connect and disconnect said piezoelectric element to said ground, based on said input signal;
a second comparator coupled to said second switch, said first transmission line, and said piezoelectric element, wherein said second comparator is configured to cause said second switch to:
connect said piezoelectric element to said electrical ground when said input signal has a lesser voltage than a voltage across said piezoelectric element scaled by a predetermined scaling factor, and
disconnect said piezoelectric element from said electrical ground when said input signal has a greater voltage than said voltage across said piezoelectric element scaled by said predetermined scaling factor;
a capacitor, a first diode, and a feedback resistor connected in series and coupled to said first comparator, wherein said first diode is configured such that a derivative feedback voltage is provided to said first comparator when said voltage across said piezoelectric element is increasing; and
a second diode connected in series to said capacitor and coupled to said second comparator, wherein said second diode is configured such that a derivative feedback voltage is provided to said second comparator when said voltage across said piezoelectric element is decreasing.

7. A method of driving a piezoelectric element, comprising:
providing an input signal having a time-varying voltage;
providing a current having a predetermined voltage;
connecting said current to a piezoelectric element and disconnecting said current from said piezoelectric element based on said input signal;
connecting said piezoelectric element to said current if said input signal has a greater voltage than a voltage across said piezoelectric element scaled by a predetermined scaling factor;
disconnecting said current from said piezoelectric element if said input signal has a lesser voltage than said voltage across said piezoelectric element scaled by a predetermined scaling factor;
connecting said piezoelectric element to an electrical ground if said input signal has a lesser voltage than a voltage across said piezoelectric element scaled by a second predetermined scaling factor; and
disconnecting said piezoelectric element from said electrical ground when said input signal has a greater voltage than a voltage across said piezoelectric element scaled by said second predetermined scaling factor, wherein, said piezoelectric element is connected to said electrical ground, a rate of voltage decrease across said piezoelectric element exceeds a rate of change of said voltage of said input signal.

8. A method of driving a piezoelectric element, comprising:
providing an input signal having a time-varying voltage;
providing a current having a predetermined voltage;
connecting said current to a piezoelectric element and disconnecting said current from said piezoelectric element based on an input signal;
connecting said piezoelectric element to said current if said input signal has a greater voltage than a voltage across said piezoelectric element scaled by a predetermined scaling factor;
disconnecting said current from said piezoelectric element if said input signal has a lesser voltage than said voltage across said piezoelectric element scaled by a predetermined scaling factor;
connecting said piezoelectric element to an electrical ground if said input signal has a lesser voltage than a voltage across said piezoelectric element scaled by a predetermined scaling factor; and
disconnecting said piezoelectric element from said electrical ground when said input signal has a greater voltage than said voltage across said piezoelectric element scaled by a predetermined scaling factor,
wherein said piezoelectric element is connected to said electrical ground, when a rate of voltage decrease across said piezoelectric element exceeds a rate of change of voltage of said signal.

9. A method of driving a piezoelectric element, comprising:
providing an input signal having a time-varying voltage;
providing a current having a predetermined voltage;
connecting said current to a piezoelectric element and disconnecting said current from said piezoelectric element based on an input signal;
connecting said piezoelectric element to said current if said input signal has a greater voltage than a voltage across said piezoelectric element scaled by a predetermined scaling factor;
disconnecting said current from said piezoelectric element if said input signal has a lesser voltage than said voltage across said piezoelectric element scaled by a predetermined scaling factor;
connecting said piezoelectric element to an electrical ground if said input signal has a lesser voltage than a voltage across said piezoelectric element scaled by a second predetermined scaling factor;
disconnecting said piezoelectric element from said electrical ground when said input signal has a greater voltage across said piezoelectric element scaled by said second predetermined scaling factor, wherein said first predetermined scaling factor is smaller than a second predetermined scaling factor;
connecting said piezoelectric element to an electrical ground if said input signal has a lesser voltage than a voltage across said piezoelectric element scaled by a predetermined scaling factor;
disconnecting said piezoelectric element from said electrical ground when said input signal has a greater voltage than said voltage across said piezoelectric element scaled by a predetermined scaling factor; and
disconnecting said piezoelectric element from said current if said input signal has a lesser voltage then said voltage across said piezoelectric element scaled by said firet predetermined scaling factor plus a derivative feedback voltage.

10. A method of driving a piezoelectric element, comprising:
providing an input signal having a time-varying voltage;
providing a current having a predetermined voltage;

connecting said current to a piezoelectric element and disconnecting said current from said piezoelectric element based on said input signal;

connecting said piezoelectric element to said current if said input signal has a greater voltage than a voltage across said piezoelectric element scaled by a predetermined scaling factor;

disconnecting said current from said piezoelectric element if said input signal has a lesser voltage than said voltage across said piezoelectric element scaled by a predetermined scaling factor, connecting said piezoelectric element to an electrical ground if said input signal has a lesser voltage than a voltage across said piezoelectric element scaled by a second predetermined scaling factor, disconnecting said piezoelectric element from said electrical ground when said input signal has a greater voltage than said voltage across said piezoelectric element scaled by a second predetermined scaling factor, and disconnecting said piezoelectric element from said current if said input signal has a lesser voltage than said voltage across said piezoelectric element scaled by said first predetermined scaling factor plus a derivative feedback voltage.

11. A method of driving a piezoelectric element, comprising:

providing an input signal having a time-varying voltage;
providing a current having a predetermined voltage;
connecting said current to a piezoelectric element and disconnecting said current from said piezoelectric element based on said input signal;

connecting said piezoelectric element to said current if said input signal has a greater voltage than a voltage across said piezoelectric element scaled by a predetermined scaling factor;

disconnecting said current from said piezoelectric element if said input signal has a lesser voltage than said voltage across said piezoelectric element scaled by a predetermined scaling factor;

connecting said piezoelectric element to an electrical ground if said input signal has a lesser voltage than a voltage across said piezoelectric element scaled by a second predetermined scaling factor;

disconnecting said piezoelectric element from said electrical ground when said input signal has a greater voltage than said voltage across said piezoelectric element scaled by a second predetermined scaling factor; and disconnecting said piezoelectric element from said current if said input signal has a lesser voltage than said voltage across said piezoelectric element scaled by said first predetermined scaling factor plus a derivative feedback voltage.

12. An apparatus for driving a piezoelectric element, comprising:

means for providing an input signal having a time-varying voltage;
means for providing a current having a predetermined voltage;
a means for connecting said current to said piezoelectric element and disconnecting said current from said piezoelectric element based on said input signal;

means for connecting said piezoelectric element to said current if said input signal has a greater voltage than a voltage across said piezoelectric element scaled by a predetermined scaling factor;

means for disconnecting said current from said piezoelectric element if said input signal has a lesser voltage than said voltage across said piezoelectric element scaled by said predetermined scaling factor;

means for connecting said piezoelectric element to an electrical ground if said input signal has a lesser voltage than a voltage across said piezoelectric element scaled by a second predetermined scaling factor; and a means for disconnecting said piezoelectric element from said electrical ground when said input signal has a greater voltage than said voltage across said piezoelectric element scaled by said second predetermined scaling factor.

13. An apparatus for driving a piezoelectric element, comprising:

means for providing an input signal having a time-varying voltage;
means for providing a current having a predetermined voltage;
means for connecting said current to said piezoelectric element and disconnecting said current from said piezoelectric element based on said input signal;

means for connecting said piezoelectric element to said current if said input signal has a greater voltage than a voltage across said piezoelectric element scaled by a predetermined scaling factor;

means for disconnecting said current from said piezoelectric element if said input signal has a lesser voltage than said voltage across said piezoelectric element scaled by said predetermined scaling factor;

a means for connecting said piezoelectric element to an electrical ground if said input signal has a lesser voltage than a voltage across said piezoelectric element scaled by a second predetermined scaling factor; and means for disconnecting said piezoelectric element from said electrical ground when said input signal has a greater voltage than said voltage across said piezoelectric element scaled by said second predetermined scaling factor, wherein when said piezoelectric element is connected to said electrical ground, a rate of voltage decrease across said piezoelectric element exceeds a rate of change of voltage of said signal.

14. An apparatus for driving a piezoelectric element, comprising:

means for providing an input signal having a time-varying voltage;
means for providing a current having a predetermined voltage;
means for connecting said current to said piezoelectric element and disconnecting said current from said piezoelectric element based on said input signal;

means for connecting said piezoelectric element to said current if said input signal has a greater voltage than a voltage across said piezoelectric element scaled by a predetermined scaling factor;

means for disconnecting said current from said piezoelectric element if said input signal has a lesser voltage than said voltage across said piezoelectric element scaled by said predetermined scaling factor;

means for connecting said piezoelectric element to an electrical ground if said input signal has a lesser voltage than a voltage across said piezoelectric element scaled by a second predetermined scaling factor;

means for disconnecting said piezoelectric element from said electrical ground when said input signal has a greater voltage than said voltage across said piezoelectric element scaled by said second predetermined scaling factor, wherein said first predetermined scaling factor is smaller than said second predetermined scaling factor.

15. An apparatus for driving a piezoelectric element, comprising:
    means for providing an input signal having a time-varying voltage;
    means for providing a current having a predetermined voltage;
    means for connecting said current to said piezoelectric element and disconnecting said current from said piezoelectric element based on said input signal;
    means for connecting said piezoelectric element to said current if said input signal has a greater voltage than a voltage across said piezoelectric element scaled by a predetermined scaling factor;
    means for disconnecting said current from said piezoelectric element if said input signal has a lesser voltage than said voltage across said piezoelectric element scaled by said predetermined scaling factor;
    means for connecting said piezoelectric element to an electrical ground if said input signal has a lesser voltage than a voltage across said piezoelectric element scaled by a second predetermined scaling factor;
    means for disconnecting said piezoelectric element from said electrical ground when said input signal has a greater voltage than said voltage across said piezoelectric element scaled by said second predetermined scaling factor; and
    means for disconnecting said piezoelectric element from said current if said input signal has a lesser voltage than said voltage across said piezoelectric element scaled by said first predetermined scaling factor plus a derivative feedback voltage.

16. An apparatus for driving a piezoelectric element, comprising:
    means for providing an input signal having a time-varying voltage;
    means for providing a current having a predetermined voltage;
    means for connecting said current to said piezoelectric element and disconnecting said current from said piezoelectric element based on said input signal;
    means for connecting said piezoelectric element to said current if said input signal has a greater voltage than a voltage across said piezoelectric element scaled by a predetermined scaling factor; and
    means for disconnecting said current from said piezoelectric element if said input signal has a lesser voltage than said voltage across said piezoelectric element scaled by said predetermined scaling factor;
    means for connecting said piezoelectric element to an electrical ground if said input signal has a lesser voltage than a voltage across said piezoelectric element scaled by a second predetermined scaling factor;
    means for disconnecting said piezoelectric element from said electrical ground when said input signal has a greater voltage than said voltage across said piezoelectric element scaled by said second predetermined scaling factor;
    means for disconnecting said piezoelectric element from said current if said input signal has a lesser voltage than said voltage across said piezoelectric element scaled by said first predetermined scaling factor plus a derivative feedback voltage; and
    means for disconnecting said piezoelectric element from said electrical ground if said input signal has a lesser voltage than said voltage across said piezoelectric element scaled by said second predetermined scaling factor plus said derivative feedback voltage.

* * * * *